(12) United States Patent
Kim et al.

(10) Patent No.: US 10,487,900 B2
(45) Date of Patent: Nov. 26, 2019

(54) NATURAL RUBBER COMPOSITION FOR VEHICLE

(71) Applicants: Hyundai Motor Company, Seoul (KR); Kia Motors Corporation, Seoul (KR)

(72) Inventors: Ho Dong Kim, Jecheon-si (KR); Heon Seob Jung, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 90 days.

(21) Appl. No.: 15/704,206

(22) Filed: Sep. 14, 2017

(65) Prior Publication Data

US 2018/0142753 A1     May 24, 2018

(30) Foreign Application Priority Data

Nov. 24, 2016  (KR) .................. 10-2016-0157061

(51) Int. Cl.
*C08K 5/40* (2006.01)
*C08K 5/435* (2006.01)
(Continued)

(52) U.S. Cl.
CPC .......... *F16F 1/3835* (2013.01); *B60G 15/068* (2013.01); *C08K 3/04* (2013.01); *C08L 7/00* (2013.01); *B60G 2204/128* (2013.01); *B60G 2204/143* (2013.01); *B60G 2204/15* (2013.01); *B60G 2204/41* (2013.01); *C08K 5/0025* (2013.01); *C08K 5/40* (2013.01); *C08K 5/435* (2013.01); *C08K 5/47* (2013.01); *C08L 2312/00* (2013.01); *C08L 2666/36* (2013.01);
(Continued)

(58) Field of Classification Search
None
See application file for complete search history.

(56) References Cited

U.S. PATENT DOCUMENTS 3,451,962 A * 6/1969 Auler ................ C08L 21/00
                                                    524/526
4,647,328 A * 3/1987 Rhee ................ B29D 29/00
                                                    152/209.23
(Continued)

FOREIGN PATENT DOCUMENTS

GB         862048 A  *  3/1961  ......... B29D 30/0005

OTHER PUBLICATIONS

Nocil Limited. Technical Note on Vulcanization & Accelerators. Retrieved from web.archive.org on Jul. 29, 2019. Archive date Aug. 3, 2016. (Year: 2016).*

*Primary Examiner* — Richard A Huhn
(74) *Attorney, Agent, or Firm* — Slater Matsil, LLP

(57) ABSTRACT

A natural rubber composition includes a natural rubber, a carbon black filler in an amount of 40 phr based on an amount of the natural rubber, a sulfur crosslinking agent in an amount of 1 phr of based on the amount of the natural rubber, and an accelerator to adjust vulcanization physical properties and a dynamic ratio. The accelerator includes a semi-ultra accelerator in an amount of 0.3 to 1 phr based on the amount of the natural rubber, a delayed accelerator in an amount of 1 to 2 phr based on the amount of the natural rubber, and an ultra accelerator in an amount of 0.3 to 1 phr based on the amount of the natural rubber.

21 Claims, 10 Drawing Sheets

(51) Int. Cl.
*C08K 5/47* (2006.01)
*C08K 3/04* (2006.01)
*C08L 7/00* (2006.01)
*F16F 1/38* (2006.01)
*B60G 15/06* (2006.01)
*C08K 5/00* (2006.01)

(52) U.S. Cl.
CPC ....... *C08L 2666/38* (2013.01); *C08L 2666/55* (2013.01); *C08L 2666/72* (2013.01)

(56) References Cited

U.S. PATENT DOCUMENTS

| | | | | |
|---|---|---|---|---|
| 2010/0227955 | A1* | 9/2010 | Miyazaki | C08L 7/00 524/83 |
| 2010/0292383 | A1* | 11/2010 | Fader | B02C 19/0012 524/423 |
| 2012/0136102 | A1* | 5/2012 | Satou | C08K 5/098 524/398 |
| 2017/0349733 | A1* | 12/2017 | Isitman | C08L 7/00 |

* cited by examiner

FIG. 3A

| Item | | Reference | Composition to optimize carbon black (Composition A) | | | | | | | | | | | | Remarks |
|---|---|---|---|---|---|---|---|---|---|---|---|---|---|---|---|
| | | | #1 | #2 | #3 | #4 | #5 | #6 | #7 | #8 | #9 | #10 | #11 | #12 | |
| Composition ratio | natural rubber | 100 | 100 | 100 | 100 | 100 | 100 | 100 | 100 | 100 | 100 | 100 | 100 | 100 | 100 | fixed factor (F) |
| | HAF | - | 40 | | | 20 | | 20 | 30 | 30 | 10 | | 10 | | | variable factor (V) |
| | FEF | 20 | | 40 | | 20 | 20 | | 10 | | 30 | 30 | | | 10 | |
| | SRF | - | | | 40 | | 20 | 20 | | 10 | | 10 | 30 | 30 | | |
| | RD(TMQ) | 1.5 | 1.5 | 1.5 | 1.5 | 1.5 | 1.5 | 1.5 | 1.5 | 1.5 | 1.5 | 1.5 | 1.5 | 1.5 | 1.5 | (F) |
| | IPPD(3C) | 1.5 | 1.5 | 1.5 | 1.5 | 1.5 | 1.5 | 1.5 | 1.5 | 1.5 | 1.5 | 1.5 | 1.5 | 1.5 | 1.5 | |
| | Sunnoc | 2 | 2 | 2 | 2 | 2 | 2 | 2 | 2 | 2 | 2 | 2 | 2 | 2 | 2 | |
| | ZnO | 3 | 3 | 3 | 3 | 3 | 3 | 3 | 3 | 3 | 3 | 3 | 3 | 3 | 3 | |
| | Steric Acid | 1.5 | 1.5 | 1.5 | 1.5 | 1.5 | 1.5 | 1.5 | 1.5 | 1.5 | 1.5 | 1.5 | 1.5 | 1.5 | 1.5 | |
| | S | 0.92 | 0.92 | 0.92 | 0.92 | 0.92 | 0.92 | 0.92 | 0.92 | 0.92 | 0.92 | 0.92 | 0.92 | 0.92 | 0.92 | Semi-EV Cure |
| | CBS(CZ) | 1.44 | 1.44 | 1.44 | 1.44 | 1.44 | 1.44 | 1.44 | 1.44 | 1.44 | 1.44 | 1.44 | 1.44 | 1.44 | 1.44 | |
| | TMTD(TT) | 0.7 | 0.7 | 0.7 | 0.7 | 0.7 | 0.7 | 0.7 | 0.7 | 0.7 | 0.7 | 0.7 | 0.7 | 0.7 | 0.7 | |
| | Acc/S | 2.3 | 2.3 | 2.3 | 2.3 | 2.3 | 2.3 | 2.3 | 2.3 | 2.3 | 2.3 | 2.3 | 2.3 | 2.3 | 2.3 | |

TABLE 1

FIG. 3B

| Item | | Reference | Composition to optimize carbon black (Composition A) | | | | | | | | | | | | Remarks |
|---|---|---|---|---|---|---|---|---|---|---|---|---|---|---|---|
| | | | #1 | #2 | #3 | #4 | #5 | #6 | #7 | #8 | #9 | #10 | #11 | #12 | |
| Rheometer | Ts2 | | 76 | 88 | 84 | 79 | 168 | 84 | 83 | 82 | 81 | 88 | 88 | 88 | Evaluation results |
| | T90 | | 162 | 176 | 166 | 188 | 301 | 181 | 206 | 177 | 179 | 180 | 186 | 180 | |
| | maximum torque | | 23.4 | 23.7 | 22.7 | 25.4 | 20.0 | 24.8 | 26.7 | 26.1 | 27.5 | 26.1 | 24.3 | 25.2 | |
| | vulcanization time | | 444 | 472 | 452 | 496 | 722 | 482 | 532 | 474 | 478 | 480 | 492 | 480 | |
| Physical properties | hardness | 47 | 57 | 57 | 54 | 60 | 51 | 58 | 59 | 59 | 59 | 59 | 55 | 55 | |
| | tensile strength | 332 | 287 | 261 | 265 | 266 | 257 | 271 | 276 | 281 | 257 | 250 | 282 | 253 | |
| | M100 | 15.3 | 16.9 | 23.9 | 19.1 | 24.8 | 17 | 21.2 | 23.1 | 22 | 28 | 23 | 20.3 | 20.9 | |
| | elongation | 610 | 660 | 490 | 530 | 510 | 570 | 530 | 540 | 550 | 480 | 560 | 560 | 520 | |
| | dynamic ratio | - | 3.01 | 2.23 | 2.10 | 2.52 | 1.92 | 2.50 | 2.78 | 2.73 | 2.30 | 2.09 | 2.38 | 2.00 | |

TABLE 1 (continued)

FIG. 4A

| Item | | Composition to optimize vulcanization physical properties (Composition B) | | | | | | | | | | | Remarks |
|---|---|---|---|---|---|---|---|---|---|---|---|---|---|
| | | #1 | #2 | #3 | #4 | #5 | #6 | #7 | #8 | #9 | #10 | #11 | |
| Composition ratio | natural rubber | 100 | 100 | 100 | 100 | 100 | 100 | 100 | 100 | 100 | 100 | 100 | (F) |
| | FEF | 40 | 40 | 40 | 40 | 40 | 40 | 40 | 40 | 40 | 40 | 40 | |
| | RD(TMQ) | 1.5 | 1.5 | 1.5 | 1.5 | 1.5 | 1.5 | 1.5 | 1.5 | 1.5 | 1.5 | 1.5 | |
| | IPPD(3C) | 1.5 | 1.5 | 1.5 | 1.5 | 1.5 | 1.5 | 1.5 | 1.5 | 1.5 | 1.5 | 1.5 | |
| | Sunnoc | 2 | 2 | 2 | 2 | 2 | 2 | 2 | 2 | 2 | 2 | 2 | |
| | ZnO | 3 | 3 | 3 | 3 | 3 | 3 | 3 | 3 | 3 | 3 | 3 | |
| | Steric Acid | 1.5 | 1.5 | 1.5 | 1.5 | 1.5 | 1.5 | 1.5 | 1.5 | 1.5 | 1.5 | 1.5 | |
| | P-OIL | 5 | 5 | 5 | 5 | 5 | 5 | 5 | 5 | 5 | 5 | 5 | |
| | S | 0.8 | 0.8 | 0.8 | 0.8 | 0.8 | 0.8 | 0.8 | 0.8 | 0.8 | 0.8 | 0.8 | |
| | D (DPG) | | | | 0.1 | 0.1 | 0.1 | 0.1 | 0.1 | 0.1 | 0.1 | 0.3 | (V) |
| | M (MBT) | | | | 2 | | | | | | | | |
| | DM (MBTS) | | | | | 2 | | | 1 | 1 | | 2 | |
| | CBS(CZ) | 2 | | 1 | | | 2 | | 1 | | 1 | | |
| | NOBS (MBS) | | 2 | 1 | | | | 2 | | 1 | 1 | | |
| | TMTD (TT) | 0.3 | 0.3 | 0.3 | 0.3 | 0.3 | 0.3 | 0.3 | 0.3 | 0.3 | 0.3 | 0.3 | |
| | PVI | 0.3 | 0.3 | 0.3 | 0.3 | 0.3 | 0.3 | 0.3 | 0.3 | 0.3 | 0.3 | 0.3 | (F) |

TABLE 2

FIG. 4B

| Item | | Composition to optimize vulcanization physical properties (Composition B) | | | | | | | | | | Remarks |
|---|---|---|---|---|---|---|---|---|---|---|---|---|
| | | #1 | #2 | #3 | #4 | #5 | #6 | #7 | #8 | #9 | #10 | #11 | |
| Rheometer | Ts2 | 169 | 201 | 173 | 37 | 72 | 161 | 207 | 96 | 85 | 176 | 69 | Evaluation results |
| | T90 | 321 | 399 | 335 | 116 | 181 | 292 | 399 | 232 | 206 | 329 | 176 | |
| | maximum torque | 19.8 | 21.3 | 21.1 | 18.2 | 22.3 | 21.7 | 22.3 | 17.3 | 19.1 | 22.9 | 20.7 | |
| | vulcanization time | 762 | 918 | 790 | 352 | 482 | 704 | 918 | 584 | 532 | 778 | 472 | |
| Physical properties | hardness | 54 | 54 | 55 | 53 | 56 | 54 | 55 | 52 | 55 | 56 | 53 | |
| | tensile strength | 244 | 247 | 242 | 221 | 238 | 238 | 241 | 235 | 242 | 240 | 240 | |
| | M100 | 19.9 | 21.2 | 20.6 | 16.7 | 22.2 | 21.6 | 22.8 | 17.9 | 21.5 | 24.3 | 20.4 | |
| | elongation | 550 | 530 | 530 | 570 | 510 | 520 | 510 | 560 | 520 | 550 | 530 | |
| | dynamic ratio | 2.24 | 2.14 | 2.14 | 2.08 | 1.93 | 2.21 | 2.22 | 2.08 | 2.03 | 2.21 | 2.08 | |

TABLE 2 (continued)

FIG. 5A

| Item | | Composition to optimize vulcanization physical properties (Composition B) | | | | | | | | | | | Remarks |
|---|---|---|---|---|---|---|---|---|---|---|---|---|---|
| | | #12 | #13 | #14 | #15 | #16 | #17 | #18 | #19 | #20 | #21 | #22 | |
| Composition ratio | natural rubber | 100 | 100 | 100 | 100 | 100 | 100 | 100 | 100 | 100 | 100 | 100 | (F) |
| | FEF | 40 | 40 | 40 | 40 | 40 | 40 | 40 | 40 | 40 | 40 | 40 | |
| | RD(TMQ) | 1.5 | 1.5 | 1.5 | 1.5 | 1.5 | 1.5 | 1.5 | 1.5 | 1.5 | 1.5 | 1.5 | |
| | IPPD(3C) | 1.5 | 1.5 | 1.5 | 1.5 | 1.5 | 1.5 | 1.5 | 1.5 | 1.5 | 1.5 | 1.5 | |
| | Sunnoc | 2 | 2 | 2 | 2 | 2 | 2 | 2 | 2 | 2 | 2 | 2 | |
| | ZnO | 3 | 3 | 3 | 3 | 3 | 3 | 3 | 3 | 3 | 3 | 3 | |
| | Steric Acid | 1.5 | 1.5 | 1.5 | 1.5 | 1.5 | 1.5 | 1.5 | 1.5 | 1.5 | 1.5 | 1.5 | |
| | P-OIL | 5 | 5 | 5 | 5 | 5 | 5 | 5 | 5 | 5 | 5 | 5 | |
| | S | 0.8 | 0.8 | 0.8 | 0.8 | 0.8 | 0.8 | 0.8 | 0.8 | 0.8 | 0.8 | 0.8 | |
| | D (DPG) | 0.3 | 0.3 | 0.3 | 0.3 | 0.3 | 0.5 | 0.5 | 0.5 | 0.5 | 0.5 | 0.5 | (V) |
| | M (MBT) | | | | | | | | | | | | |
| | DM (MBTS) | 2 | | | 1 | 1 | 2 | | | 1 | 1 | | |
| | CZ (CBS) | 2 | | 1 | | 1 | 2 | | 1 | | | 1 | |
| | NOBS (MBS) | | 2 | | 1 | 1 | | 2 | | 1 | | 1 | |
| | TMTD (TT) | 0.3 | 0.3 | 0.3 | 0.3 | 0.3 | 0.3 | 0.3 | 0.3 | 0.3 | 0.3 | 0.3 | |
| | PVI | 0.3 | 0.3 | 0.3 | 0.3 | 0.3 | 0.3 | 0.3 | 0.3 | 0.3 | 0.3 | 0.3 | (F) |

TABLE 3

FIG. 5B

| Item | | Composition to optimize vulcanization physical properties (Composition B) | | | | | | | | | | Remarks |
|---|---|---|---|---|---|---|---|---|---|---|---|---|
| | | #12 | #13 | #14 | #15 | #16 | #17 | #18 | #19 | #20 | #21 | #22 | |
| rheometer | Ts2 | 132 | 173 | 75 | 87 | 155 | 59 | 148 | 140 | 73 | 77 | 226 | Evaluation results |
| | T90 | 249 | 349 | 160 | 234 | 306 | 156 | 283 | 327 | 171 | 203 | 406 | |
| | maximum torque | 22.7 | 23.1 | 20.1 | 23.3 | 23.3 | 22.7 | 22.8 | 24.1 | 22.2 | 24.1 | 20.5 | |
| | vulcanization time | 618 | 818 | 440 | 588 | 732 | 432 | 686 | 774 | 432 | 526 | 932 | |
| physical properties | hardness | 55 | 56 | 55 | 57 | 56 | 57 | 56 | 57 | 57 | 58 | 54 | |
| | tensile strength | 233 | 239 | 235 | 235 | 234 | 233 | 245 | 226 | 234 | 234 | 244 | |
| | M100 | 21.3 | 23.0 | 19.9 | 23.7 | 24.4 | 22.5 | 22.3 | 24.6 | 22.3 | 22.5 | 19.2 | |
| | elongation | 510 | 510 | 540 | 510 | 490 | 540 | 520 | 480 | 510 | 480 | 540 | |
| | dynamic ratio | 2.37 | 2.32 | 2.06 | 2.24 | 2.33 | 2.11 | 2.39 | 2.35 | 2.32 | 2.20 | 2.32 | |

TABLE 3 (continued)

FIG. 6A

| Item | | Composition to optimize vulcanization physical properties and dynamic ratio (Composition C) | | | | | | | | | | | | | Remarks |
|---|---|---|---|---|---|---|---|---|---|---|---|---|---|---|---|
| | | #1 | #2 | #9 | #10 | #11 | #3 | #4 | #5 | #6 | #7 | #8 | #12 | #13 | |
| Composition ratio | NR | 100 | 100 | 100 | 100 | 100 | 100 | 100 | 100 | 100 | 100 | 100 | 100 | 100 | (F) |
| | FEF(N550) | 30 | 30 | 30 | 30 | 30 | 30 | 30 | 30 | 30 | 30 | 30 | 30 | 30 | |
| | SRF(N774) | 10 | 10 | 10 | 10 | 10 | 10 | 10 | 10 | 10 | 10 | 10 | 10 | 10 | |
| | RD(TMQ) | 1.5 | 1.5 | 1.5 | 1.5 | 1.5 | 1.5 | 1.5 | 1.5 | 1.5 | 1.5 | 1.5 | 1.5 | 1.5 | |
| | IPPD(3C) | 1.5 | 1.5 | 1.5 | 1.5 | 1.5 | 1.5 | 1.5 | 1.5 | 1.5 | 1.5 | 1.5 | 1.5 | 1.5 | |
| | Sunnoc | 2 | 2 | 2 | 2 | 2 | 2 | 2 | 2 | 2 | 2 | 2 | 2 | 2 | |
| | ZnO | 3 | 3 | 3 | 3 | 3 | 3 | 3 | 3 | 3 | 3 | 3 | 3 | 3 | |
| | Steric Acid | 1.5 | 1.5 | 1.5 | 1.5 | 1.5 | 1.5 | 1.5 | 1.5 | 1.5 | 1.5 | 1.5 | 1.5 | 1.5 | |
| | S | 1 | 1 | 1 | 1 | 1 | 1 | 1 | 1 | 1 | 1 | 1 | 1 | 1 | (V) |
| | D (DPG) | 0.1 | 0.1 | 0.1 | 0.1 | 0.1 | | | | | | 0.1 | 0.1 | 0.1 | |
| | M (MBT) | | | | | | | 0.3 | | 0.3 | | 0.3 | | | |
| | DM (MBTS) | 0.5 | 0.3 | 0.1 | 0.5 | 0.5 | 0.5 | | 0.3 | | 0.3 | | 0.5 | 0.5 | |
| | CZ (CBS) | | | | | | | | 1.5 | | 1.8 | | | | |
| | NOBS (MBS) | 1.5 | 1.5 | 1.5 | 1.5 | 1.5 | 1.5 | 1.5 | | 1.5 | | 1.5 | 1.5 | 1.5 | |
| | TMTD(TT) | 0.5 | 0.5 | 0.5 | 1.0 | 1.2 | 0.5 | 0.5 | 0.5 | 0.4 | 0.4 | 0.5 | 0.5 | 0.5 | |
| | PVI | 0.3 | 0.3 | 0.3 | 0.3 | 0.3 | 0.3 | 0.3 | 0.3 | 0.3 | 0.3 | 0.3 | 0.5 | 0.7 | (F) |

TABLE 4

FIG. 6B

| Item | | Composition to optimize vulcanization physical properties and dynamic ratio (Composition C) | | | | | | | | | | | | | Remarks |
|---|---|---|---|---|---|---|---|---|---|---|---|---|---|---|---|
| | | #1 | #2 | #9 | #10 | #11 | #3 | #4 | #5 | #6 | #7 | #8 | #12 | #13 | |
| Rheometer | Ts2 | 90 | 98 | 103 | 88 | 75 | 92 | 88 | 105 | 111 | 114 | 93 | 103 | 124 | Evaluation results |
| | T90 | 244 | 247 | 278 | 232 | 212 | 257 | 222 | 225 | 274 | 234 | 233 | 260 | 283 | |
| | maximum torque | 27.8 | 25.7 | 24.7 | 28.0 | 28.6 | 27.4 | 28.4 | 25.8 | 26.8 | 26.7 | 23.8 | 27.5 | 25.6 | |
| | vulcanization time | 608 | 614 | 676 | 584 | 544 | 634 | 564 | 570 | 668 | 588 | 586 | 540 | 686 | |
| Physical properties | hardness | 60 | 58 | 59 | 60 | 61 | 59 | 60 | 58 | 59 | 59 | 60 | 59 | 57 | |
| | tensile strength | 255 | 261 | 253 | 256 | 257 | 262 | 252 | 269 | 262 | 280 | 264 | 251 | 239 | |
| | M100 | 29.7 | 25.9 | 25.1 | 30.1 | 30.6 | 30.4 | 30.1 | 25.7 | 26.6 | 27.1 | 29.2 | 29.6 | 26.3 | |
| | elongation | 470 | 490 | 480 | 460 | 430 | 470 | 460 | 510 | 490 | 510 | 490 | 470 | 430 | |
| | dynamic ratio | 2.13 | 2.22 | 2.24 | 2.16 | 2.20 | 2.16 | 2.20 | 2.22 | 2.22 | 2.22 | 2.24 | 2.19 | 2.25 | |

TABLE 4 (continued)

NATURAL RUBBER COMPOSITION FOR VEHICLE

CROSS-REFERENCE TO RELATED APPLICATIONS

This application claims the benefit of Korean Patent Application No. 10-2016-0157061, filed on Nov. 24, 2016 in the Korean Intellectual Property Office, the disclosure of which is incorporated herein by reference.

TECHNICAL FIELD

Embodiments of the present disclosure relate to natural rubber compositions for vehicle.

BACKGROUND

Automotive anti-vibration rubber parts play an important role in reducing vibrations and noises generated during motion of vehicles and improving comfort of the vehicles. Extensive research has been conducted into long-term durability of vehicles and damage analysis thereof for the past few years. Driving quietness has drawn attention with growing concern about ride comfort and steering stability.

Among anti-vibration rubber parts, suspension bushes are applied to chassis arm assemblies of vehicles. Ride comfort and handling (R&H) performance of a vehicle may be considerably improved depending on materials used therefor. Thus, research has been conducted into materials to improve performance of new vehicles and maintain initial performance after long-term driving as well as increase both initial quality study (IQS) index and vehicle durability study (VDS) index.

SUMMARY

Embodiments of the present disclosure relate to natural rubber compositions for vehicle, and in particular embodiments, to natural rubber compositions for vehicle applicable to automotive anti-vibration rubber parts such as suspension bushes.

It is an aspect of the present disclosure to provide a natural rubber composition for vehicle including a natural rubber, carbon black, a sulfur crosslinking agent, an accelerator, and an activator mixed in an appropriate composition ratio.

Additional aspects of the disclosure will be set forth in part in the description which follows and, in part, will be obvious from the description, or may be learned by practice of the disclosure.

According to an aspect of the present invention, there is provided a natural rubber composition for vehicle configured to achieve a preset reference hardness. The natural rubber composition includes a natural rubber, a carbon black filler in an amount of 40 phr based on an amount of the natural rubber, a sulfur crosslinking agent in an amount of 1 phr of based on the amount of the natural rubber, and an accelerator to adjust vulcanization physical properties and a dynamic ratio. The accelerator comprises a semi-ultra accelerator in an amount of 0.3 to 1 phr based on the amount of the natural rubber, a delayed accelerator in an amount of 1 to 2 phr based on the amount of the natural rubber, and an ultra accelerator in an amount of 0.3 to 1 phr based on the amount of the natural rubber.

The carbon black filler may comprise fast extrusion furnace carbon black (FEF) and semi-reinforcing furnace carbon black (SRF) in a ratio of 3:1 to achieve a reference hardness HS60.

The carbon black filler may comprise FEF and SRF to have a ratio of FEF/SRF greater than 3 to achieve a reference hardness HS60 or less.

The carbon black filler may comprise FEF and SRF to have a ratio of FEF/SRF less than 3 to achieve a reference hardness HS60 or greater.

The semi-ultra accelerator may comprise a 2-mercaptobenzothiazole accelerator or a thiazole-based accelerator, wherein the delayed accelerator comprises a sulfonamide-based accelerator, and the ultra accelerator comprises a thiuram-based accelerator.

The thiazole-based may comprise dibenzothiazol disulfide, the sulfonamide-based accelerator comprises at least one of N-cyclohexyl-2-benzothiazole sulfonamide (CBS) and N-oxydiethylene-2-benzothiazol sulfonamide (NOBS), and the thiuram-based accelerator may comprise tetra methyl thiuram disulfide.

The accelerator further may comprise a guanidine-based accelerator comprising 1,3-diphenyl guanidine 1,3-diphenyl guanidine in an amount of 0.3 phr or less based on the amount of the natural rubber to accelerate the activity of the semi-ultra accelerator.

The natural rubber composition may further comprise an antidegradant in an amount of 5 phr based on the amount of the natural rubber; an activator in an amount of 4.5 phr based on the amount of the natural rubber, and a retarder in an amount of 0.1 to 0.5 phr based on the amount of the natural rubber.

The retarder may comprise poly(vinylimidazole).

The antidegradant may comprise at least one of a quinoline-type antidegradant having heat ageing resistance, a wax-type antidegradant having heat ageing resistance, and an antiozonant.

The activator may comprise at least one of zinc oxide (ZnO) and stearic acid.

The activator may comprise zinc oxide and stearic acid in a ratio of 2:1.

The natural rubber composition may have a Ts2 value of 90 to 150 s.

The natural rubber composition may have a T90 value of 220 to 300 s.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3, which is split between FIGS. 3A and 3B, provides Table 1;

FIG. 4, which is split between FIGS. 4A and 4B, provides Table 2;

FIG. 5, which is split between FIGS. 5A and 5B, provides Table 3; and

FIG. 6, which is split between FIGS. 6A and 6B, provides Table 4.

DETAILED DESCRIPTION OF ILLUSTRATIVE EMBODIMENTS

Figure 1:
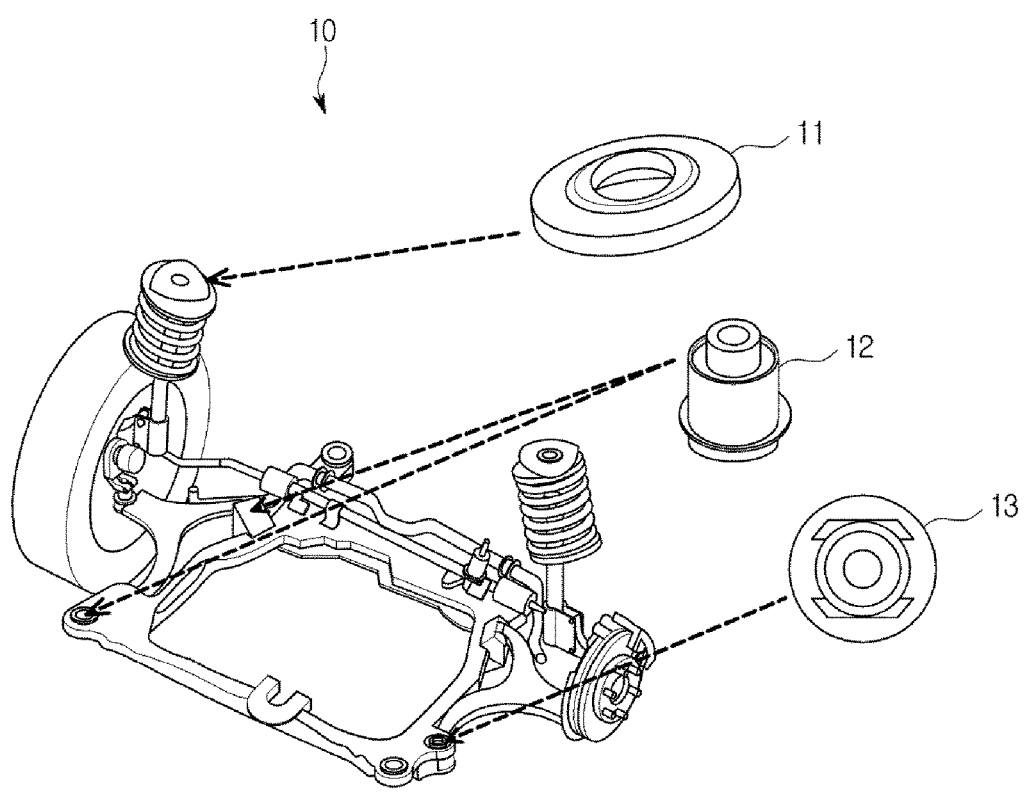
FIG. 1 is an exploded view of a suspension bush of a front wheel chassis module of a vehicle to which a natural rubber composition for vehicle according to an embodiment is applied.

Reference will now be made in detail to the embodiments of the present disclosure, examples of which are illustrated in the accompanying drawings, wherein like reference numerals refer to like elements throughout. In the following description of the present disclosure, a detailed description of known functions and configurations incorporated herein will be omitted when it may make the subject matter of the present disclosure rather unclear.

Also, it is to be understood that the terms "include" or "have" are intended to indicate the existence of elements disclosed in the specification, and are not intended to preclude the possibility that one or more other elements may exist or may be added.

Throughout the specification, it will be understood that when one element, is referred to as being "on" another element, it can be directly on the other element, or intervening elements may also be present therebetween.

It will be understood that, although the terms "first," "second," and the like, may be used herein to distinguish one element from another, and therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

A natural rubber composition for vehicle according to an embodiment may improve ride comfort and handling (R&H) performance of vehicles, vibration isolation among parts, and durability and heat resistance. More particularly, the natural rubber composition for vehicle may be prepared by mixing a natural rubber, a carbon black filler, a crosslinking agent, an accelerator, and the like in an appropriate mixing ratio.

The natural rubber composition for vehicle according to an embodiment may be applied to a rubber material of a suspension bush for vehicle. In this regard, the suspension bush for vehicle refers to a part used to prevent transmission of vibration when a suspension arm or a load is mounted on a body.

Hereinafter, a natural rubber composition for vehicle according to an embodiment applied to a suspension bush of a vehicle will be described with reference to the accompanying drawings and then components and composition ratios of the natural rubber composition for vehicle will be described in detail.

Figure 2:
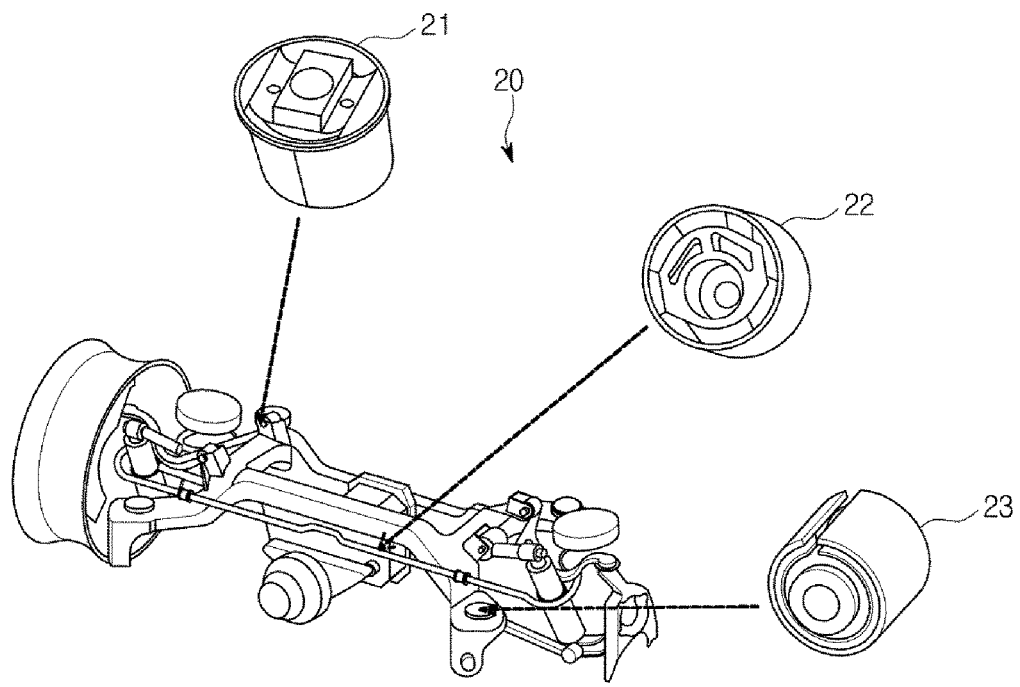
FIG. 2 is an exploded view of a suspension bush of a rear wheel chassis module of a vehicle to which a natural rubber composition for vehicle according to an embodiment is applied.

FIG. 1 is an exploded view of a suspension bush of a front wheel chassis module of a vehicle to which a natural rubber composition for vehicle according to an embodiment is applied. FIG. 2 is an exploded view of a suspension bush of a rear wheel chassis module of a vehicle to which a natural rubber composition for vehicle according to an embodiment is applied.

Referring to FIGS. 1 and 2, a front wheel chassis module 10 of a vehicle may include parts such as a strut insulator 11, a subframe bush 12, and a lower arm G bush 13, and a rear wheel chassis module 20 may include parts such as a cross member bush 21, a deep mount bush 22, and a rear lower arm bush 23.

These parts are exemplary types of the suspension bush used to reduce vibration generated during motion of a vehicle. Meanwhile, examples of the suspension bush are not limited to those illustrated in FIGS. 1 and 2 and may also be understood as those including modifications obvious to those skilled in the art.

Rubber generally used as a material for suspension bushes of vehicles has properties, such as ride comfort, durability, and heat resistance, in a trade-off relationship. That is, as durability increases, ride comfort and heat resistance decrease. As ride comfort increases, durability and heat resistance decrease.

However, to deal with these properties, types of components mixed with the natural rubber and a mixing ratio of the components are adjusted in the natural rubber composition for vehicle according to an embodiment, thereby improving ride comfort and handling (R&H) performance of the vehicle and vibration isolation, durability, and heat resistance of parts.

Hereinafter, components of the natural rubber composition for vehicle according to an embodiment and composition ratios thereof will be described in more detail.

The natural rubber composition includes a natural rubber, a carbon black filler in an amount of 40 phr based on an amount of the natural rubber, a sulfur crosslinking agent in an amount of 1 phr based on the amount of the natural rubber, an accelerator to control vulcanization physical properties and a dynamic ratio, an activator in an amount of 4.5 phr based on the amount of the natural rubber, an antidegradant in an amount of 5 phr based on the amount of the natural rubber, and a retarder in an amount of 0.1 to 0.5 phr based on the amount of the natural rubber to achieve a preset reference hardness.

The natural rubber is a base resin of the natural rubber composition, and a mixture of natural rubbers was used in the present embodiment to improve durability of parts. More particularly, natural rubbers having a Mooney viscosity of CV60 Grade from Malaysia (SMR), Thailand (STR), and Vietnam (SVR) was used, but examples of the available natural rubbers are not limited thereto.

The carbon black filler is used to improve durability of parts and optimize vibration isolation and a mixture of fast extrusion furnace carbon black (FEF) and semi-reinforcing furnace carbon black (SRF) was used therefor. Hereinafter, the fast extrusion furnace carbon black will be referred to as FEF and the semi-reinforcing furnace carbon black will be referred to as SRF.

In this regard, FEF is a material having a particle diameter of about 40 to about 48 nm. As the amount of FEF increases in comparison with SRF, durability is improved. Meanwhile, SRF is a material having a particle diameter of about 61 to about too nm. As the amount of SRF increases in comparison with FEF, ride comfort is improved. Thus, a mixing ratio of FEF and SRF may be appropriately adjusted.

According to an embodiment, the reference hardness is set to HS60, and the base resin was prepared by adding the carbon black filler thereto in an amount of 40 phr based on the amount of the natural rubber to achieve the reference hardness HS60. The reference hardness may be designed variously according to designer's intentions and the amount of the carbon black filler relative to that of the natural rubber is determined in accordance with a desired reference hardness. Here, the reference hardness is set to HS60 for descriptive convenience, and the amount of the carbon black filler to achieve the reference hardness was fixed to 40 phr.

The carbon black filler may be prepared by mixing FEF and SRF in a mixing ratio of 3:1 to optimize physical properties of the natural rubber composition. In other words, 30 phr of FEF and to phr of SRF may be added thereto based on too parts by weight of the natural rubber. By adjusting the mixing ratio of FEF and SRF as described above, fatigue resistance and vibration isolation (dynamic ratio), which are in a trade-off relationship, may be simultaneously improved.

Meanwhile, in case of increasing or decreasing the hardness higher or lower than the reference hardness HS60, the mixing ratio of the FEF and SRF may be adjusted to optimize physical properties of the natural rubber composition.

More particularly, to obtain a hardness lower than the reference hardness HS60, the amount of FEF may be increased to reinforce fatigue resistance at a low hardness. For example, the mixing ratio of FEF and SRF may be 4:1.

On the contrary, to obtain a hardness higher than the reference hardness HS60, the amount of FEF may be decreased to increase dynamic ratio at a high hardness. For example, the mixing ratio of FEF and SRF may be 5:2.

Thus, the mixing ratio of FEF and SRF may be appropriately adjusted in accordance with physical properties intended by a designer.

The sulfur crosslinking agent was used for vulcanization, and the amount of the sulfur crosslinking agent was 1 phr, which is commonly applied in the art.

As the accelerator, a delayed accelerator, an ultra accelerator, and a semi-ultra accelerator were used.

The delayed accelerator is used to reduce a reaction rate and improve quality of products. In the present embodiment, a sulfonamide-based accelerator including at least one of N-cyclohexyl-2-benzothiazole sulfonamide (CBS(CZ)) and N-oxydiethylene-2-benzothiazol sulfonamide (NOBS (MBS)) was used as the delayed accelerator.

The ultra accelerator is used to increase the reaction rate. In the present embodiment, a thiuram-based accelerator including tetra methyl thiuram disulfide (TMTD(Tf)) was used as the ultra accelerator.

The semi-ultra accelerator is used to adjust the reaction rate between those by the delayed accelerator and the ultra accelerator. In the present embodiment, a thiazole-based accelerator including at least one of 2-mercaptobenzothiazole (M(MBT)) and dibenzothiazol disulfide (DM(MBTS) was used as the semi-ultra accelerator.

Meanwhile, the semi-ultra accelerator may further include a guanidine-based accelerator including 1,3-diphenyl guanidine (D(DPG)) to accelerate the activity of DM(MBTS). 1,3-diphenyl guanidine may also be regarded as the semi-ultra accelerator due to a function of accelerating the activity of DM(MBTS), which is the semi-ultra accelerator.

Particularly, the amount of the guanidine-based accelerator may be 0.3 phr or less based on the amount of the natural rubber. If the amount of the guanidine-based accelerator is less than 0.3 phr based on the amount of the natural rubber, a vulcanization time may be optimized. On the contrary, if the amount of the guanidine-based accelerator is greater than 0.3 phr based on the amount of the natural rubber, the vulcanization time decreases resulting in difficulty in mixing or causing a scorch. Thus, the amount of the guanidine-based accelerator may be adjusted appropriately.

According to the present disclosure, the mixing ratio of these accelerators may be adjusted to obtain excellent physical properties such as tensile strength and elongation simultaneously with the effect of vibration isolation.

First, the semi-ultra accelerator was added in an amount of 0.3 to 1 phr based on the amount of the natural rubber. If the amount of the semi-ultra accelerator is less than 0.3 phr, the effect of the semi-ultra accelerator may be negligible. On the contrary, if the amount of the semi-ultra accelerator is greater than 1 phr, a scorch may be caused. Thus, the amount of the semi-ultra accelerator may be adjusted appropriately.

The amount of the delayed accelerator was in the range of 1 to 2 phr based on the amount of the natural rubber. This amount is commonly used in the art and may also be adjusted by those of ordinary skill in the art.

The amount of the ultra accelerator was in the range of 0.3 to 1 phr, preferably 0.5 to 0.7 phr, based on the amount of the natural rubber. If the amount of the ultra accelerator is less than 0.3 phr, the effect of adding the ultra accelerator may be negligible. On the contrary, if the amount of the ultra accelerator is greater than 1 phr, over vulcanization or a scorch may be caused. Thus, the amount of the ultra accelerator may be appropriately adjusted.

The activator may be used to accelerate the activity of the sulfur crosslinking agent. The amount of the activator may be 4.5 phr based on the amount of the natural rubber and may also be adjusted by those of ordinary skill in the art.

The activator may include at least one of zinc oxide (ZnO) and stearic acid. For example, a mixture of zinc oxide and stearic acid in a ratio of 2:1 may be used, but types of the available activator are not limited thereto.

Meanwhile, the natural rubber composition according to an embodiment may include an antidegradant to prevent degradation of the composition by heat and ozone. The amount of the antidegradant may be 5 phr based on the amount of the natural rubber and may also be adjusted by those of ordinary skill in the art.

The antidegradant may include at least one of a quinoline-type antidegradant having heat ageing resistance, a wax-type antidegradant having heat ageing resistance, and an antiozonant. More particularly, the quinoline-type antidegradant may be RD (TMQ), the wax-type antidegradant may be IPPD wax, and the antiozonant may be SUNNOC. However, types of the available antidegradant are not limited thereto.

The retarder may be used to prevent the scorch during a molding process. The amount of the retarder may be in the range of 0.1 to 0.5 phr based on the amount of the natural rubber and may also be adjusted by those of ordinary skill in the art.

Scorch is premature partial vulcanization of rubber by heat during processing or storage thereof. If a scorch is caused, crosslinking occurs under undesired conditions resulting in deterioration of quality of parts and performance of products. Thus, according to the present disclosure, the scorch may be prevented by adding the retarder for a molding process.

The retarder may be poly(vinylimidazole) (PVI) but types of the available retarder are not limited thereto.

Meanwhile, a plasticizer may further be used according to an embodiment. The plasticizer may be a paraffin oil such as P-Oil or a naphthalene oil.

The components of the natural rubber composition available for the material of the suspension bush among parts of vehicles and mixing ratios thereof have been descried above.

Hereinafter, grounds for determining the mixing ratio as described above will be described in detail with reference to the following examples to aid understandings thereof.

FIGS. 3-6 illustrate four tables, i.e., Tables 1 to 4. For the convenience of description and better understanding of the present disclosure, physical property data of samples prepared according to Tables 1 to 4 are evaluated based on the following criteria.

First, as tensile strength, modulus, and elongation increase, durability is evaluated as higher when applied to the same shape.

Also, as dynamic ratio, regarded as the same criterion to evaluate noise, vibration, and harshness (NVH), decreases, noise, vibration, and harshness (NVH) isolation is evaluated as higher when applied to the same shape.

In addition, a time measured by a rheometer should be within a recommended range of time to mold a suspension bush part with excellent properties. However, even if the measured time is within the recommended time range, a shorter time is evaluated as higher productivity with reduced manufacturing costs. Meanwhile, if the measured time is shorter than the recommended time, a scorch may be caused, resulting in quality deterioration. If the measured time is longer than the recommended time, productivity may decrease.

Ts2, which is a rheometer value indicating a start point of crosslinking, is a time required for an increase of 2 points from a minimum torque. According to the present embodiment, it is evaluated that if the Ts2 value of the natural rubber composition is in the range of 90 to 150 s, the scorch is prevented and productivity increases.

T90 is a rheometer value indicating a time required for the torque to reach 90% of a maximum torque. According to the present embodiment, it is evaluated that if the T90 is in the range of 220 to 300 s, manufacturing costs may be reduced due to high productivity.

Hereinafter, grounds for determining an optimum mixing ratio of the carbon black will be described with reference to Tables 1 to 4 in FIGS. 3-6, respectively. Particularly, grounds for determining the type and mixing ratio of the carbon black will be described with reference to Table 1 (FIG. 3). An optimum mixing ratio of the accelerator to satisfy vulcanization physical properties of the natural rubber composition will be described with reference to Tables 2 and 3 (FIGS. 4 and 5). An optimum mixing ratio of the accelerator to satisfy both vulcanization physical properties and dynamic ratio characteristics of the natural rubber composition will be described with reference to Table 4 (FIG. 6).

First, referring to Table 1 (FIG. 3), grounds for determining the type and amount of carbon black will be described.

Referring to Table 1, HAF refers to high abrasion furnace carbon black, and Acc/S refers to a mixing ratio of an S accelerator to S.

Table 1 shows physical properties obtained by adjusting the amounts of FEF and SRF while fixing the amounts of the natural rubber, the antidegradant, the activator, sulfur, the accelerator to find out an optimal mixing ratio of carbon black.

Among basic physical properties of Compositions A#1 to A#12 shown in Table 1, it was confirmed that Compositions A#1 to #12 had tensile strengths of 250 to 280 kgf/cm$^2$ and elongations of 500 to 600% indicating excellent tensile strength and elongation.

Meanwhile, it was confirmed that Compositions A#5, A#10 and A#12 had dynamic ratios (NVH isolation) of 1.92, 2.09, and 2.00, respectively, showing excellent dynamic ratio characteristics. In this regard, results of Composition A#5 were excluded since the Ts2 and T90 values of the rheometer were 168 and 301, respectively, different from those of the others. Since Composition A#12 had a hardness of 55 and a relatively lower elongation than Composition #10, results thereof were excluded.

As a result, it was confirmed that excellent physical properties were obtained by mixing FEF and SRF in a ratio of 3:1 in the carbon black to achieve the reference hardness HS60.

Meanwhile, since Composition A#5 had a Ts2 value of 88 and a T90 value of 180, it was confirmed that desired vulcanization conditions were not satisfied.

Thus, various experiments were performed to find out an optimum mixing ratio by adjusting types and amounts of the accelerators while fixing the amounts of the activator, the antidegradant, and sulfur to satisfy desired vulcanization conditions.

Hereinafter, physical properties of samples prepared in accordance with Tables 2 and 3 below were measured to find out an optimum mixing ratio of accelerators to satisfy desired vulcanization conditions.

In the experiments according to Tables 2 and 3, the amount of carbon black was fixed to 40 phr to achieve the reference hardness HS60.

Also, the amounts of RD(TMQ), IPPD(3C), and Sunnoc, as the antidegradants, were fixed to 1.5 phr, 1.5 phr, and 2 phr, respectively. The amounts of zinc oxide, stearic acid, and P-Oil, as the activators, were fixed to 3 phr, 1.5 phr, and 5 phr, respectively. The amount of sulfur (S), as the crosslinking agent, was fixed to 1 phr, and the amount of PVI, as the retarder, was fixed to 0.3 phr.

Then, experiments were performed by adjusting the amounts of the accelerators to optimize vulcanization physical properties.

Experiments were performed by adjusting the amounts of CZ(CBS) and NOBS(MBS) in Compositions B#1 to B#3. Experiments were performed by adjusting the amounts of M(MBT), DM(MBTS), CZ(CBS), and NOBS(MBS) in Compositions B#4 to B#10 while fixing the amount of D(DPG) to 0.1 phr. Experiments were performed by adjusting the amounts of DM(MBTS), CZ(CBS), and NOBS (MBS) in Compositions B#11 to B#16 while fixing the amount of D(DPG) to 0.3 phr. Experiments were performed by adjusting the amounts of DM(MBTS), CZ(CBS), and NOBS(MBS) in Compositions B#17 to B#22 while fixing the amount of D(DPG) to 0.5 phr.

As a result of the experiments of Compositions B#1 to B#3, the effects of adjusting the amounts of CZ(CBS) and NOBS(MBS) were observed. It was confirmed that Compositions B#1 to B#3 had physical properties similar to those of conventional compositions and a relatively long vulcanization time.

As a result of the experiments of Compositions B#4 to B#10, the effects of adjusting the amounts of M(MBT), DM(MBTS), CZ(CBS), and NOBS(MBS) while fixing the amount D(DPG) to 0.1 phr were observed. It was confirmed that Compositions B#4 to B#10 had physical properties similar to those of conventional compositions and Composition B#8 exhibited an optimum vulcanization time.

As a result of the experiments of Compositions B#11 to B#16, the effects of adjusting the amounts of DM(MBTS), CZ(CBS), and NOBS(MBS) while fixing the amount D(DPG) to 0.3 phr were observed. It was confirmed that Compositions #12 and #16 exhibited optimum vulcanization times but lower dynamic ratio characteristics than conventional compositions.

As a result of the experiments of Compositions B#17 to B#22, the effects of adjusting the amounts of DM(MBTS), CZ(CBS), and NOBS(MBS) while fixing the amount D(DPG) to 0.5 phr were observed. It was confirmed that Compositions B#18 and B#19 exhibited optimum vulcanization times but lower dynamic ratio characteristics than conventional compositions.

Comprehensive results suggest that if the amount of D(DPG) is greater than 0.3 phr, the vulcanization time decreases causing a scorch and failing to optimize mixing ratios. Thus, the amount of D(DPG) may be adjusted to be 0.3 phr or less.

For example, referring to Ts2 values of Compositions B#5, B#11, and B#17, Composition B#5 had a Ts2 value of 72 s, Composition B#11 had a Ts2 value of 69 s, and Composition B#17 had a Ts2 value of 59 s. It was identified that the Ts2 value tends to decrease as the amount of D(DPG) increases. Particularly, if the amount of D(DPG) is greater than 0.3 phr, the Ts2 value decreases to 59s resulting in difficult in molding. In addition, Composition B#5 including 0.1 phr of D(DPG) had a dynamic ratio of 1.93 indicating better dynamic ratio characteristics than Composition B#11 including 0.3 phr of D(DPG).

As another example, referring to Ts2 values of Compositions B#9, B#15, and B#21, Composition B#9 had a Ts2 value of 85 s, Composition B#15 had a Ts2 value of 87 s, and Composition B#21 had a Ts2 value of 77 s. Thus, it was identified that the Ts2 value tends to decrease as the amount of D(DPG) increases. Particularly, if the amount of D(DPG) is greater than 0.3 phr, the Ts2 value decreases to 77 s resulting in difficult in molding property. In addition, Composition B#9 including 0.1 phr of D(DPG) had a dynamic ratio of 2.03 indicating better dynamic ratio characteristics than Composition B#15 including 0.3 phr of D(DPG).

Although the vulcanization time was optimized by adjusting the amounts of D(DPG), M(MBT), DM(MBTS), CZ(CBS), and NOBS(MBS) in accordance with Tables 2 and 3, the dynamic ratio characteristics were unsatisfactory.

Thus, physical properties of samples prepared in accordance with Table 4 below were measured to optimize not only vulcanization conditions but also dynamic ratio characteristics based on the experiments in accordance with Tables 2 and 3.

In the experiment in accordance with Table 4 (FIG. 6), the amount of carbon black was fixed to 40 phr to achieve the reference hardness HS60 and FEF and SRF were used in a mixing ratio of 3:1 based on the type and amount of carbon block listed in Table 1.

Also, the amounts of RD(TMQ), IPPD(3C), and Sunnoc, as the antidegradants, were fixed to 1.5 phr, 1.5 phr, and 2 phr, respectively. The amounts of zinc oxide and stearic acid, as the activators, were fixed to 3 phr and 1.5 phr, respectively. The amount of sulfur (S), as the crosslinking agent, was fixed to 1 phr, and the amount of PVI, as the retarder, was fixed to 0.3 phr.

Then, the experiment was performed by adjusting the amounts of the accelerators to optimize vulcanization physical properties and dynamic ratio.

First, it was confirmed that an appropriate amount of the ultra accelerator TMTD(Tr) was in the range of 0.3 to 1 phr based on the experiment results of the mixtures of Tables 2 and 3 and Compositions C#1, C#10, and C#11 of Table 4.

Particularly, Compositions C#1, C#10, and C#11 of Table 4 include 0.5 phr, 1.0 phr, and 1.2 phr of the ultra accelerator TMTD(TT), respectively. It was confirmed that Composition C#11 including 1.2 phr of the ultra accelerator TMTD(TT) had poor dynamic ratio characteristics than Compositions C#1 and C#10. Thus, it was confirmed that excellent dynamic ratio characteristics may be obtained and the scorch may not be caused by adding 1.0 phr or less of TMTD(T), preferably about 0.5 phr of TMTD(TT), thereto.

Meanwhile, it was confirmed that the effect of the ultra accelerator may be obtained by adding 0.3 phr or greater of TMTD(TI) thereto based on the results of experiments in accordance with Tables 2 and 3.

In conclusion, it was confirmed that an appropriate amount of the ultra accelerator TMTD(TI) was in the range of 0.3 to 1 phr.

Then, the effect of adding the semi-ultra accelerator D(DPG) was observed based on the results of experiments of Compositions C#1 and C#3 in accordance with Table 4.

It was confirmed that Composition C#1 of Table 4 including the semi-ultra accelerator D(DPG) had better dynamic ratio characteristics and higher Ts2 and T90 rheometer values than Composition C#3 to which the semi-ultra accelerator D(DPG) was not added.

Then, it was confirmed that an appropriate amount of the semi-ultra accelerator DM(MBTS) was in the range of 0.3 to 1.0 phr based on the results of experiments in accordance with Tables 2 to 4.

Compositions B#5, B#11, and B#17 of Tables 2 and 3 include 2 phr of DM(MBTS). In this case, the Ts2 values thereof were 72 s, 69 s, and 59 s, respectively, which are far lower than a lower limit of 90 s increasing the risk of causing a scorch.

On the contrary, Compositions B#9, B#15, and B#21 include 1 phr of DM(MBTS). In this case, the Ts2 values thereof were 85 s, 87 s, and 77 s, respectively, which are close to the lower limit of the Ts2 value. Thus, it was confirmed that the amount of DM(MBTS) may be maintained 1.0 phr or less.

Then, Compositions C#1, C#2, and C#9 of Table 4 include 0.5 phr, 0.3 phr, and 0.1 phr of DM(MBTS), respectively. It was confirmed that Composition C#9 including 0.1 phr of DM(MBTS) exhibited a relatively longer vulcanization time than those of Compositions C#1 and C#2, thereby decreasing productivity.

On the contrary, Compositions C#1 and C#2 including 0.3 phr and 0.5 phr of DM(MBTS), respectively had satisfactory Ts2 and T90 values in comparison with Composition C#9. Particularly, Composition C#1 had the best dynamic ratio characteristics.

As a result, an appropriate amount of the semi-ultra accelerator DM(MBTS) may be in the range of 0.3 to 1.0 phr. If the amount of DM(MBTS) is about 0.3 phr, not only the vulcanization time but also dynamic ratio characteristics may be optimized.

Then, it was also confirmed that an appropriate amount of the delayed accelerator NOBS(MBS) was in the range of 1.0 to 2.0 phr based on the results of experiments in accordance with Tables 2 to 4.

In general, 1.0 to 2.0 phr of the delayed accelerator NOBS(MBS) is used. It was confirmed that physical properties were improved when the amounts of the delayed accelerator NOBS(MBS) were 1.0 phr, 1.5 phr, 1.8 phr, and 2.0 phr based on the results of Tables 2 to 4.

Particularly, referring to Tables 2 and 3, Compositions B#7, B#9, and B#10 respectively including 2 phr, 1 phr, and 1 phr of NOBS(MBS) had dynamic ratios of 2.22, 2.03 and 2.21, respectively. It was confirmed that Compositions B#7, B#9, and B#10 had excellent dynamic ratio characteristics.

Also, referring to Table 4, Compositions C#1, C#2, C#9, C#10, C#3, C#4, and C#8 include 1.5 phr of NOBS(MBS), and Composition C#6 includes 1.8 phr of NOBS(MBS). It was confirmed that Compositions C#1, C#2, C#9, C#10, C#3, C#4, and C#8 had dynamic ratios of 2.13, 2.22, 2.24, 2.16, 2.16, 2.20, and 2.24, respectively, indicating excellent dynamic ratio characteristics. It was also confirmed that Composition C#6 had a dynamic ratio of 2.22 indicating excellent dynamic ratio characteristics.

Also, the effects of the delayed accelerators CZ(CBS) and NOBS(MBS) with respect to the amounts thereof were observed based on the results of experiments of Compositions C#4 to C#7 in accordance with Table 4.

Compositions C#4 and C#6 include 1.5 phr and 1.8 phr of the delayed accelerator NOBS(MBS), and Compositions C#5 and C#7 include 1.5 phr and 1.8 phr of the delayed accelerator CZ(CBS). It was confirmed than Composition C#4 including 1.5 phr of NOBS(MBS) had the best dynamic ratio characteristics.

Then, it was confirmed that an appropriate amount of the retarder PVI was in the range of 0.1 to 0.5 phr based on the results of experiments of Compositions C#1, C#12, and C#13 in accordance with Tables 1 and 4.

Particularly, the mixtures listed in Table 1 not including the retarder PVI had very low Ts2 and T90 values.

On the contrary, Compositions C#1, C#12, and C#13 of Table 4 respectively include 0.3 phr, 0.5 phr, and 0.7 phr of PVI. Compositions C#1 and C#12 had satisfactory Ts2 and T90 values until the amount of PVI increases to 0.5 phr. However, Composition C#13 including 0.7 phr of PVI had Ts2 and T90 values of 124 s and 283 s, respectively indicating too long vulcanization time, indicating poor physical properties.

In conclusion, it was confirmed that an appropriate amount of the retarder PVI was in the range of 0.1 to 0.5 phr for mass production of the natural rubber composition according to an embodiment.

Based on the results of experiments, it was confirmed that the best effects were obtained when the semi-ultra accelerator D(DPG) was blended with DM(MBTS) and TMTD(TT) and the mixing ratio was optimized by adding small amounts of the delayed accelerator NOBS(MBS) and the retarder PVI thereto.

Therefore, a composition having the composition ratio of Composition C#1 was used as a base composition of the natural rubber composition according to an embodiment to achieve the reference hardness HS60. However, the composition ratio of the natural rubber composition is not limited to that of Composition C#1 and may also be understood including the aforementioned ranges of additives.

Hereinafter, experimental prototype prepared using the natural rubber composition having the composition ratio of Composition C#1 and evaluation results thereof will be described to aid understandings.

Among suspension bushes, a rear-wheel CTBA bush was prepared by using the natural rubber composition according to the present embodiment. Among conventional rear-wheel CTBA bushes, experimental prototypes having the following properties were selected for comparison of physical properties with those of the experimental prototype molded using Composition C#1.

Mass Production 1

An experimental prototype in accordance with Mass Production 1 was manufactured using a general-purpose suspension bush material including sulfur (S) in an amount of 1.5 phr or greater via conventional vulcanization (CV) curing.

Mass Production 2

An experimental prototype in accordance with Mass Production 2 was manufactured in the same manner as in Mass Production 1 above except that a general-purpose suspension bush material including sulfur (S) was used in an amount of 1.0 to 1.5 phr.

Mass Production 3

An experimental prototype in accordance with Mass Production 3 was manufacturing by blending natural rubber and butadiene rubber as a polymer material instead of the natural rubber alone.

The experimental prototypes prepared according to Mass Productions 1 to 3 and experimental prototype C#1 according to an embodiment of the present disclosure were evaluated in terms of physical properties of materials and characteristics of parts prepared using the materials, and the results are shown in Table 5 below.

TABLE 5

| | | | Mass produced material | | | Developed material Experimental prototype C#1 |
|---|---|---|---|---|---|---|
| | Item [hardness 61 Hs] | | [mass production 1] | [mass production 2] | [mass production 3] | |
| Materials | | heat resistance | 70° C. × 70 hr | 70° C. × 1,000 hr | 70° C. × 1,000 hr | 70° C. × 1,000 hr |
| | Physical properties | Tensile strength (MPa) | 20 | 21 | 19 | 26 |
| | | Elongation (%) | 510 | 420 | 530 | 470 |
| | | Rebound resilience (%) | 57 | 60 | 64 | 72 |
| Parts | Characteristics | Static property (kgf/mm) | 77.4 | 80.0 | 70.3 | 70.1 |
| | | Dynamic ratio @15 Hz (Kd/Ks) | 1.65 | 1.52 | 1.53 | 1.37 |
| | | @100 Hz | 2.91 | 2.34 | 2.69 | 1.66 |
| | Durability | Durability at room temperature (*P1 20 ± 580 kgf)/R 6 ± 6 deg)) | 860,000 Crack | 860,000 Crack | 440,000 Crack | 1,000,000 Crack |

Referring to Table 5, although the experimental prototype C#1 had a similar elongation to those of the conventional experimental prototypes according to Mass Productions 1, 2, and 3, a tensile strength of the experimental prototype C#1 was about 30% higher than that of the conventional experimental prototypes.

Also, it was confirmed that the experimental prototype C#1 had a dynamic ratio of 1.37 at 15 Hz, which is less than 1.65 of the experimental prototype according to Mass Production 1 by 20%.

In addition, it was confirmed that the experimental prototype C#1 had excellent durability at room temperature satisfying the durability standards of 1,000,000 cycles.

In conclusion, it was confirmed that tensile strength, dynamic ratio characteristics, and durability may be improved if the natural rubber composition according to an embodiment is applied to suspension bushes.

As is apparent from the above description, according to the natural rubber composition for vehicle according to an embodiment, the following effects may be obtained. First, ride comfort and handling (R&H) of vehicles and vibration isolation, durability, and heat resistance of parts may be improved by adding carbon black, the sulfur crosslinking agent, the accelerator, and the activator to the natural rubber composition in an appropriate ratio.

Also, even after long-term aging of parts, variation of characteristics of the parts may be maintained less than 30%, thereby improving VDS quality index.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A natural rubber composition comprising:
    a natural rubber;
    a carbon black filler in an amount of 40 phr based on an amount of the natural rubber;
    a sulfur crosslinking agent in an amount of 1 phr of based on the amount of the natural rubber;
    an accelerator comprising:
    a first accelerator in an amount of 0.3 to 1 phr based on the amount of the natural rubber, wherein the first accelerator comprises a 2-mercaptobenzothiazole accelerator or a thiazole-based accelerator;
    a second accelerator in an amount of 1 to 2 phr based on the amount of the natural rubber, wherein the second accelerator comprises a sulfonamide-based accelerator; and
    an third accelerator in an amount of 0.3 to 1 phr based on the amount of the natural rubber, wherein the third accelerator comprises a thiuram-based accelerator.

2. The natural rubber composition of claim 1, wherein the carbon black filler comprises fast extrusion furnace carbon black (FEF) and semi-reinforcing furnace carbon black (SRF) in a ratio of 3:1 to achieve a reference hardness HS60.

3. The natural rubber composition of claim 1, wherein the carbon black filler comprises fast extrusion furnace carbon black (FEF) and semi-reinforcing furnace carbon black (SRF) to have a ratio of FEF/SRF greater than 3 to achieve a reference hardness HS60 or less.

4. The natural rubber composition of claim 1, wherein the carbon black filler comprises fast extrusion furnace carbon black (FEF) and semi-reinforcing furnace carbon black (SRF) to have a ratio of FEF/SRF less than 3 to achieve a reference hardness HS60 or greater.

5. The natural rubber composition of claim 1, wherein the semi-first accelerator comprises a 2-mercaptobenzothiazole accelerator.

6. The natural rubber composition of claim 1, wherein the first accelerator comprises a thiazole-based accelerator.

7. The natural rubber composition of claim 6, wherein the thiazole-based accelerator comprises dibenzothiazol disulfide;
    wherein the sulfonamide-based accelerator comprises N-cyclohexyl-2-benzothiazole sulfonamide (CBS) or N-oxydiethylene-2-benzothiazol sulfonamide (NOBS); and
    wherein the thiuram-based accelerator comprises tetra methyl thiuram disulfide.

8. The natural rubber composition of claim 1, wherein the accelerator further comprises a guanidine-based accelerator comprising 1,3-diphenyl guanidine 1,3-diphenyl guanidine in an amount of 0.3 phr or less based on the amount of the natural rubber.

9. The natural rubber composition of claim 1, further comprising:
    an antidegradant in an amount of 5 phr based on the amount of the natural rubber;
    an activator in an amount of 4.5 phr based on the amount of the natural rubber; and
    a retarder in an amount of 0.1 to 0.5 phr based on the amount of the natural rubber.

10. The natural rubber composition of claim 9, wherein the retarder comprises poly(vinylimidazole).

11. The natural rubber composition of claim 9, wherein the antidegradant comprises a material selected from the group consisting of a quinoline-type antidegradant having heat ageing resistance, a wax-type antidegradant having heat ageing resistance, and an antiozonant, and combinations thereof.

12. The natural rubber composition of claim 9, wherein the activator comprises zinc oxide or stearic acid.

13. The natural rubber composition of claim 12, wherein the activator comprises zinc oxide and stearic acid in a ratio of 2:1.

14. The natural rubber composition of claim 1, wherein the natural rubber composition has a Ts2 value of 90 to 150 s.

15. The natural rubber composition of claim 1, wherein the natural rubber composition has a T90 value of 220 to 300 s.

16. A wheel chassis module of a vehicle, the module comprising:
    a strut insulator;
    a subframe bush; and
    a lower arm G bush;
    wherein the subframe bush or the lower arm G bush is formed from a natural rubber composition comprising:
    a natural rubber;
    a carbon black filler in an amount of 40 phr based on an amount of the natural rubber;
    a sulfur crosslinking agent in an amount of 1 phr of based on the amount of the natural rubber;
    a first accelerator in an amount of 0.3 to 1 phr based on the amount of the natural rubber, wherein the first accelerator comprises a 2-mercaptobenzothiazole accelerator or a thiazole-based accelerator;
    a second accelerator in an amount of 1 to 2 phr based on the amount of the natural rubber, wherein the second accelerator comprises a sulfonamide-based accelerator; and
    an third accelerator in an amount of 0.3 to 1 phr based on the amount of the natural rubber, wherein the third accelerator comprises a thiuram-based accelerator.

17. The wheel chassis module of claim 16, wherein the first-accelerator comprises a 2-mercaptobenzothiazole accelerator.

18. The wheel chassis module of claim 16, wherein the first-accelerator comprises a thiazole-based accelerator.

19. A wheel chassis module of a vehicle, the module comprising:
    a cross member bush;
    a deep mount bush; and
    a rear lower arm bush;
    wherein the cross member bush, the deep mount bush or the rear lower arm bush is formed from a natural rubber composition comprising:

a natural rubber;
a carbon black filler in an amount of 40 phr based on an amount of the natural rubber;
a sulfur crosslinking agent in an amount of 1 phr of based on the amount of the natural rubber;
and an accelerator comprising:
   a first accelerator in an amount of 0.3 to 1 phr based on the amount of the natural rubber, wherein the first accelerator comprises a 2-mercaptobenzothiazole accelerator or a thiazole-based accelerator;
   a second accelerator in an amount of 1 to 2 phr based on the amount of the natural rubber, wherein the second accelerator comprises a sulfonamide-based accelerator;
   and a third accelerator in an amount of 0.3 to 1 phr based on the amount of the natural rubber, wherein the third accelerator comprises a thiuram-based accelerator.

20. The wheel chassis module of claim 19, wherein the first accelerator comprises a 2-mercaptobenzothiazole accelerator.

21. The wheel chassis module of claim 19, wherein the first accelerator comprises a thiazole-based accelerator.

\* \* \* \* \*